May 20, 1969     L. C. DELATORRE     3,445,746

BATTERY LOW VOLTAGE CUTOFF AND REGULATOR

Filed Nov. 10, 1966

Leroy C. Delatorre
INVENTOR.

BY

ATTORNEYS ns Patent Office 3,445,746
Patented May 20, 1969

3,445,746
BATTERY LOW VOLTAGE CUTOFF AND REGULATOR
Leroy Christopher Delatorre, Houston, Tex., assignor to Camco, Incorporated, Houston, Tex., a corporation of Texas
Filed Nov. 10, 1966, Ser. No. 593,461
Int. Cl. H02j 7/04, 7/16
U.S. Cl. 320—40        3 Claims

ABSTRACT OF THE DISCLOSURE

A battery low voltage cutoff and regulator for use in a gas lift system to provide an accurate and fail safe operation. The regulator has a first switch and a voltage regulator to provide a regulated supply voltage to a gas lift timer control and solenoid. It also measures battery voltage. When the battery voltage falls to a predetermined level, the regulator actuates another switch which deactuates the first switch. This switching action disconnects the battery supply.

---

Figure 1:
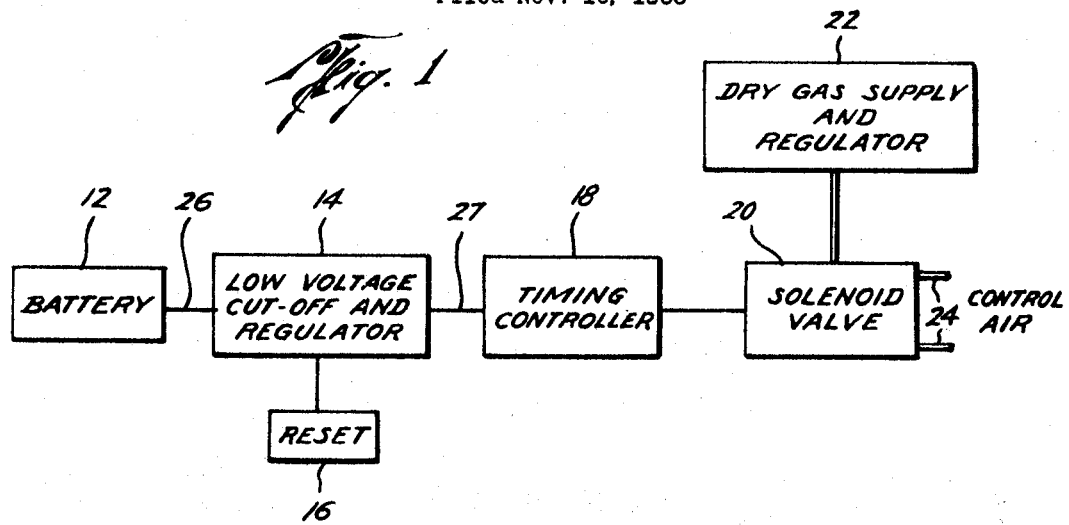

Generally, the gas lift process involves the intermittent injection of gas into a well to provide the motive force for production. If the gas is supplied at too frequent intervals or for too long periods of time, the operating costs are excessive. On the other hand, if the gas is provided at too slow a rate or for too short periods of time, optimum production from the well is not obtained. Therefore, a timing controller is utilized to suitably actuate and deactuate a solenoid valve at desired times and time intervals for optimum production. Since the gas lift systems are operated in remote locations from batteries, it is important that a constant voltage be supplied by the battery in order not to adversely affect the timing accuracy of the timing controller. In addition, it is desirable that the timing controller operate uniformly and accurately independent of ageing effects on the battery and it is therefore important to have a battery voltage regulator which will maintain a constant value which is determined by the lowest desired operating battery voltage.

Furthermore, since the same gas supply may be used for a number of wells, it is important that if the battery fails, the timing controller must not stop in a position in which the injection cycle is locked in as this could also adversely affect production from other wells.

It is, therefore, an object of the present invention to provide a battery low voltage cutoff and regulator to provide a supply voltage that is independent of the ageing effect of the battery and will cut off the battery supply in a fail safe condition if the battery voltage falls below a predetermined value for any reason.

A still further object of the present invention is the provision of the improvement in a gas lift injection system by providing a battery low voltage cutoff and regulator which will maintain the supply voltage to the timing controller set at a constant value, and will insure that the system will not fail with the injection cycle locked in an on position.

Yet a still further object of the present invention is the provision of a battery low voltage cutoff regulator which includes a first switching means for connection to the battery for receiving the battery voltage, a voltage regulator connected to the first switching means, a voltage measuring means for measuring when the battery voltage falls below a predetermined value, and provided with a second switching means which is actuated by the voltage measuring means to deactuate the first switching means and disconnect the battery supply in the event the battery voltage decreases below the predetermined desired level.

Still a further object of the present invention is the improvement of a fail safe battery low voltage cutoff for use in a gas lift timing controller in which a solenoid valve provides injection gas to a well upon electrical energization in which a first switching means is connected to the battery, and a voltage regulator is connected between the first switching means and the timing controller and solenoid, and a voltage measuring means is connected to a second switching means which deactuates the first switching means when the battery voltage falls below a predetermined level to disconnect the battery supply and deactuate the solenoid valve to a closed position, and after which, the system cannot be again reactivated except by resetting.

Figure 2:
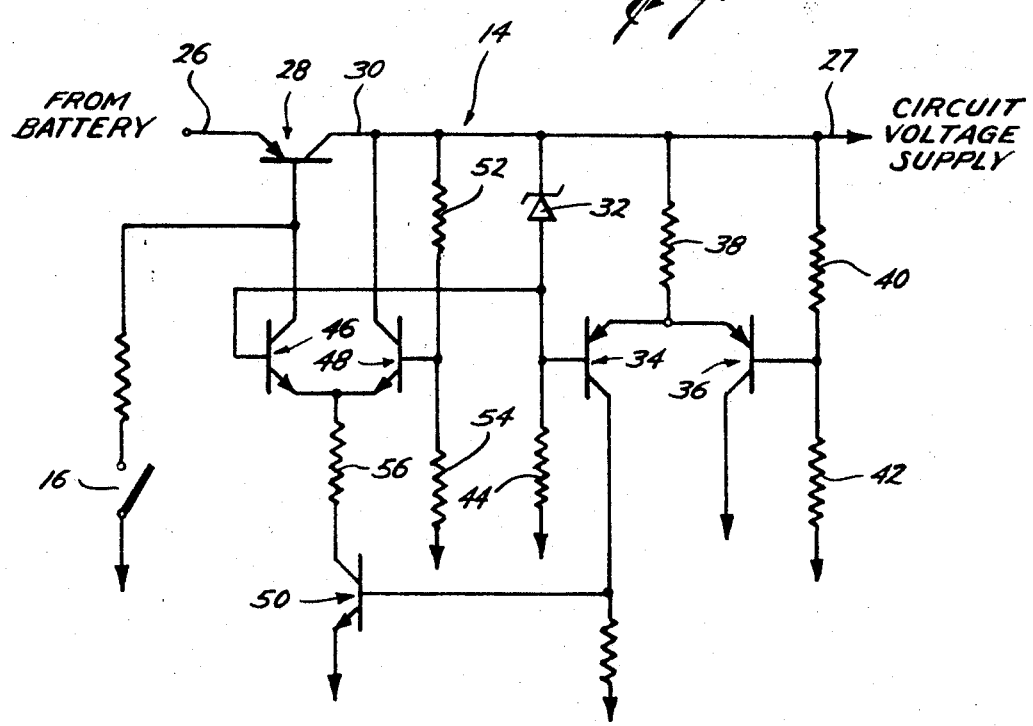

Other and further objects, features and advantages will be apparent in the following description of a presently preferred embodiment of the invention, given for the purpose of disclosure, and taken in conjunction with the accompanying drawing, where like character references designate like parts throughout the several views, and where, FIGURE 1 is an electrical block diagram illustrating a gas lift cycle controller of the present invention, and FIGURE 2 is an electrical schematic of the battery low voltage cutoff regulator.

Referring now to the drawing, and particularly to FIGURE 1, the reference numeral 10 generally indicates the gas lift time cycle controller of the present invention. The controller 10 generally includes a battery 12 for supplying the electrical power, a low voltage cutoff and regulator 14 having a reset button 16, which is connected to the battery to provide a constant voltage supply to a timing controller 18, which is turn controls a solenoid valve 20 for providing a supply of gas from a suitable gas supply and regulator 22 to a well (not shown) through lines 24 to provide gas for a gas lift operation.

The timing controller 18 may be of any suitable type for actuating the solenoid valve 20 at the desired intervals of time at which the valve is actuated and controlling the length of time that the valve is open. Since the timing controller 18 is conventional, no further description is believed to be necessary and a fuller description of a suitable controller is set forth in patent application Ser. No. 483,289, filed Aug. 27, 1965. Solenoid valve 20 is of the type which when energized provides gas from the supply 22 through lines 24 to the well and when de-energized is closed and cuts off the supply of injection gas to the well, as distinguished from a pulse actuated bi-stable type solenoid valve.

An important feature of the present invention is the provision of the battery low voltage cutoff and regulator 14 which is positioned between the supply voltage from the battery 12 and the timing controller 18 for the purpose of maintaining the supply voltage applied to the controller 18 at a constant value determined by the lowest desired operating battery voltage. By the use of the voltage regulator the timing controller is not affected by voltage variations in the battery and thus the timing accuracy and the stability of the controller 18 remain unaffected as the battery output varies with age and other conditions. In addition, as will be more fully described hereinafter, the low voltage cutoff and regulator 14 disconnects the battery from the circuit when the battery voltage drops below a predetermined minimum value thereby disconnecting power from the solenoid valve 20 insuring that the valve will be deactuated so that the system 10 will not fail in a position with the injection cycle in an on position.

Referring now to FIGURE 2, the battery low voltage cutoff and regulator 14 is shown schematically, the input of which is connected to line 26 leading to the battery 12 and the output being line 27 supplying the regulated voltage to the timing controller 18. The input from the battery through line 26 is connected to a first switching means 28, preferably a transistor. The collector 30 of transistor 28 is connected to a voltage regulator circuit which includes a reference Zener diode 32, a differential amplifier including transistor 34, 36 and 50 and circuit resistors 38, 40, 42, 44 and 56.

The switching means 28 is actuated by a reset button 16 connecting the base of transistor 28 to ground to actuate transistor 28 and thus applying the battery voltage to the collector 30 and thus to the voltage regulator. Thus the battery voltage is applied across the diode 32 to the base of transistor 34 and the voltage is applied across resistor 40 to the base of transistor 38. Since the voltage across the diode 32 is selected at a predetermined constant voltage to give the desired constant output voltage at the output 27, variations in the battery supply voltage will create a varying voltage drop across the resistor 40 which is then compared with the voltage drop across the diode 32 by the differential amplifier including the transistors 34 and 36 to provide a correction signal to maintain the voltage supply at the output 28 constant. The voltage regulator is set to maintain the voltage at a constant value determined by the lowest desired operating battery voltage and thereby the timing accuracy and stability of the timing controller 18 will not be affected by variations in the battery voltage due to old age, temperature and the like. By way of example only, using a 6 volt battery the voltage regulator may be set to provide a 4 volt output. The structure and operation of the voltage regulator itself is conventional and no further description is believed to be necessary.

In addition, other switching means such as transistor 46, transistor 48, including resistors 52 and 54 are provided to disconnect the battery 12 from the circuit when the battery voltage drops below a minimum fixed value, which is generally set only slightly below the lowest desired operating voltage of the voltage regulator, and to insure that the deactuated circuit will not be turned on again until the reset button 16 is actuated.

At the time the circuit 14 is first actuated by depressing the reset button 16 to turn on the transistor 28 and thus apply battery voltage on the collector 30, a voltage is applied to the base of transistor 48 from the collector 30 of transistor 28 through the resistors 52 and 54 which are selected to normally turn transistor 46 on, but are chosen so that transistor 48 will remain off. In addition, the voltage supplied through the collector circuit of the transistor 34 is applied to the base of transistor 50 to turn that transistor on so that when the reset button 16 is released a path of flow is provided from the base of transistor 28 through transistor 46 and transistor 50 to ground to allow transistor 28 to remain on.

However, when the battery voltage drops to the regulated value of the circuit voltage, transistor 28 becomes saturated and any further drop in battery voltage results in a like drop in circuit voltage. As the battery voltage across resistor 52 becomes equal to the voltage across diode 32, the transistor 48 is allowed to conduct and any further decrease in battery voltage now results in a low voltage at the base of transistor 46 as compaerd to its emitter, and transistor 46 is cut off thereby turning off the base current path for transistor 28. Thus transistor 28 is deactuated so that the circuit voltage is turned off, goes to zero and remains there until sufficient battery voltage is provided, such as providing a new battery for battery 12, and the reset button 16 is actuated. Of course, since the regulated supply voltage of line 28 through the timing controller 18 and solenoid valve 20 is turned off, the solenoid valve 20 is thus placed in the off position disconnecting any injection gas from the lines 24 to the supply well whereby failure of the system of this particular well will not adversely affect other well injection systems.

In operation, the reset button 16 is actuated thereby connecting the base of transistor 28 to ground thereby switching transistor 28 on to apply the voltage from battery 12 to the collector 30 of the transistor 28 and thus to the voltage regulator portion of the circuit which generally consists of the reference diode 32, resistor 40 and the differential amplifier including transistors 34 and 36. Thus the voltage regulator will act to maintain the output circuit voltage supply at line 27 constant at a predetermined value in spite of voltage variations from the battery 12. Thus the timing controller 18 will receive a constant voltage thereby maintaining its timing accuracy and will at periodic timed intervals actuate and deactuate the solenoid valve 20 for predetermined intervals of time to supply injection gas from the supply 22 through the control lines 24 and to a well to provide the motive force for production. However, when the battery voltage drops below the minimum fixed value transistor 48 is turned on and transistor 46 is turned off to disconnect the base current path of the switching transistor 28 thereby disconnecting the battery voltage from the timing controller 18 and the solenoid valve 20. After the switching transistor 28 has been disconnected the circuit will not turn on again until the battery 12 provides sufficient voltage, such as being replaced, and the reset button reactuated.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be made which will readily suggest themselves to those skilled in the art and which are encompased within the spirit of the invention and the scope of the appended claims.

What is claimed is:

1. In a gas lift timing controller for providing timed cycles of gas injection from a gas supply for a well including a solenoid valve supplying gas to said well when energized, a timing controller for timing and controlling the operation of the solenoid valve, a battery providing supply voltage, the improvement of a fail safe battery low voltage cutoff regulator comprising, first switching means for connection to the battery,
   a voltage regulator connected between the first switching means and having an output supplying voltage to the timing controller and solenoid,
   voltage measuring means for measuring when the battery voltage falls below a predetermined value above zero,
   second switching means connected between the voltage measuring means and the first switching means, and
   third switching means connected to the first switching means and to the second switching means and actuated upon a predetermined value of battery voltage above zero for deactuating said second switching means which in turn disconnects the battery supply.

2. In a gas lift timing controller for providing timed cycles of gas injection from a gas supply for a well including a solenoid valve passing supply gas to the well when energized, a timing controller for timing and controlling the operation of the solenoid valve, a battery for providing supply voltage, the improvement of a battery low voltage cutoff regulator comprising, a switching transistor, the emitter of which is connected to the battery,
   a push button switch connected between the ground and the base of the switching transistor,
   a voltage regulator connected to the collector of the switching transistor,
   voltage measuring means connected to the transistor collector for measuring when the battery voltage falls below a predetermined value,
   second switching means connected between the base of the switching transistor and the measuring means, and
   third switching means connected to the first switching means and to the second switching means and actuated upon a predetermined value of battery voltage above zero for deactuating said second switching means which in turn disconnects the battery supply.

3. In a gas lift timing controller for providing timed cycle of gas injection from a gas supply for a well including a solenoid valve passing supply gas to the well when energized, a timing controller for timing and controlling the operation of the solenoid valve, a battery for providing supply voltage, the improvement of a battery low voltage cutoff regulator comprising, a first transistor having an emitter, a base and a collector, the emitter of which is connected to the battery, a voltage regulator connected to the collector of the first transistor and having an output supplying regulated voltage to the timing controller and solenoid, voltage measuring means connected to the collector of the first transistor for measuring when the battery voltage falls below a predetermined value above zero, a second transistor having an emitter, a base and a collector, the collector of the second transistor connected to the base of the first transistor, and the base of the second transistor connected to the voltage measuring means, a third transistor having an emitter, a base and a collector, the collector connected to the collector of the first transistor, the base which is connected through a resistance to the collector of the first transistor the emitter of which is connected to the emitter of the second transistor whereby on a predetermined low value of battery voltage above zero the third transistor is actuated to deactuate the second transistor which in turn deactuates the first transistor.

References Cited

UNITED STATES PATENTS

| | | | |
|---|---|---|---|
| 3,129,362 | 4/1964 | Gilbert | 317—140 |
| 3,182,246 | 5/1965 | Lloyd | 323—22 |
| 3,235,787 | 2/1966 | Gordon et al. | 323—22 |
| 3,344,340 | 9/1967 | Webb | 323—22 |
| 3,389,325 | 6/1968 | Gilbert | 320—31 |

JOHN F. COUCH, Primary Examiner.

STANLEY WEINBERG, Assistant Examiner.

U.S. Cl. X.R.

317—33, 54; 323—22